United States Patent
Chapra et al.

(10) Patent No.: US 9,646,112 B2
(45) Date of Patent: May 9, 2017

(54) SYSTEM, METHOD, AND COMPUTER-READABLE MEDIUM FOR PROVIDING A DYNAMIC VIEW AND TESTING TOOL OF POWER CABLING OF A MULTI-CHASSIS COMPUTER SYSTEM

(75) Inventors: John Mark Chapra, Del Mar, CA (US); John Lawrence Perkins, Escondido, CA (US)

(73) Assignee: Teradata US, Inc., Dayton, OH (US)

( * ) Notice: Subject to any disclaimer, the term of this patent is extended or adjusted under 35 U.S.C. 154(b) by 1711 days.

(21) Appl. No.: 12/961,622

(22) Filed: Dec. 7, 2010

(65) Prior Publication Data
US 2011/0161877 A1    Jun. 30, 2011

Related U.S. Application Data

(60) Provisional application No. 61/291,683, filed on Dec. 31, 2009.

(51) Int. Cl.
*G06F 3/0481*    (2013.01)
*G06F 17/50*    (2006.01)

(52) U.S. Cl.
CPC ............ *G06F 17/50* (2013.01); *G06F 3/0481* (2013.01); *G06F 2217/36* (2013.01)

(58) Field of Classification Search
CPC .......... H04N 21/42225; G09G 2330/02; A61B 1/00034; H01L 27/3269; H01M 2220/20; H01M 10/4257; G06F 17/50; G06F 2217/36
USPC ................................ 715/736, 810, 734, 859
See application file for complete search history.

(56) References Cited

U.S. PATENT DOCUMENTS

| | | | |
|---|---|---|---|
| 5,606,664 A * | 2/1997 | Brown et al. ................. 709/224 |
| 5,850,539 A * | 12/1998 | Cook et al. ..................... 703/20 |
| 7,024,627 B2 * | 4/2006 | Kumar et al. ................ 715/733 |
| 7,444,208 B2 * | 10/2008 | Kadoi ....................... G06F 1/30 700/22 |
| 7,996,190 B2 * | 8/2011 | Huizar Rodriguez ........... G06F 17/509 703/1 |
| 8,601,131 B1 * | 12/2013 | Wood et al. .................. 709/227 |
| 2002/0186259 A1 * | 12/2002 | Meandzija et al. ........... 345/853 |
| 2004/0015340 A1 * | 1/2004 | Kadoi et al. ..................... 703/18 |
| 2004/0061486 A1 * | 4/2004 | Peeke et al. .................... 324/66 |
| 2004/0199342 A1 * | 10/2004 | Graves et al. .................. 702/60 |
| 2005/0078422 A1 * | 4/2005 | Pincu et al. .................... 361/62 |
| 2005/0182831 A1 * | 8/2005 | Uchida et al. ................ 709/220 |
| 2007/0240052 A1 * | 10/2007 | Sherrill ................... G06F 3/048 715/700 |

(Continued)

*Primary Examiner* — Amy M Levy
(74) *Attorney, Agent, or Firm* — Steven McDonald; Randy L. Campbell, Jr.

(57) ABSTRACT

A system, method, and computer-readable medium that facilitate display of a system configuration are provided. A graphical user interface may provide a display that indicates the position and status of system components and enables a user a convenient mechanism to determine via load group selection a universal power supply load group that is preferred to be connected to a particular chassis power supply, and further provides a mechanism to determine via load group selection which universal power supply load group is connected to a particular chassis power supply. In this manner, a user may confirm a system power supply configuration corresponds to a desired system power supply configuration.

20 Claims, 8 Drawing Sheets

(56) References Cited

U.S. PATENT DOCUMENTS

| | | | | |
|---|---|---|---|---|
| 2007/0268644 A1* | 11/2007 | Schweitzer | ............ | H02H 3/042 361/115 |
| 2009/0077478 A1* | 3/2009 | Gillingham | ......... | H04L 41/0803 715/763 |
| 2009/0083019 A1* | 3/2009 | Nasle | .............................. | 703/18 |
| 2009/0152216 A1* | 6/2009 | Champion et al. | ............. | 211/26 |
| 2011/0209082 A1* | 8/2011 | Conzola | ................ | G06F 17/509 715/771 |

* cited by examiner

SYSTEM, METHOD, AND COMPUTER-READABLE MEDIUM FOR PROVIDING A DYNAMIC VIEW AND TESTING TOOL OF POWER CABLING OF A MULTI-CHASSIS COMPUTER SYSTEM

CROSS REFERENCE TO RELATED APPLICATIONS

This application claims priority under 35 U.S.C. §119(e) to Provisional Patent Application Ser. No. 61/291,683, entitled "SYSTEM, METHOD, AND COMPUTER-READABLE MEDIUM FOR PROVIDING A DYNAMIC VIEW AND TESTING TOOL OF POWER CABLING OF A MULTI-CHASSIS COMPUTER SYSTEM," filed on Dec. 31, 2009, by John Chapra and John Perkins.

BACKGROUND

A database is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

One of the goals of a database management system is to optimize the performance of queries for access and manipulation of data stored in the database. Given a target environment, an optimal query plan is selected, with the optimal query plan being the one with the lowest cost (e.g., response time) as determined by an optimizer. The response time is the amount of time it takes to complete the execution of a query on a given system.

In massively parallel processing (MPP) systems, densely packed, rack based, multi-chassis computer systems require complex power cabling. During setup and maintenance, it is often difficult for technicians to detect improper cabling. If left undetected, an improperly cabled system may appear to be functioning normally but may lead to faulty shutdown sequencing in a power failure scenario which could lead to data corruption. Such systems are generally provided with user documentation or, at best, static images and help text for system component power configuration. Disadvantageously, such mechanisms are laborious and often lead to incorrect system configurations.

SUMMARY

Disclosed embodiments provide a system, method, and computer readable medium for display of a system configuration. A graphical user interface may provide a display that indicates the position and status of system components and enables a user a convenient mechanism to determine via load group selection which particular universal power supply load group is preferred to be connected to which chassis power supply, and further provides a mechanism to determine via load group selection which universal power supply load group is connected to which chassis power supply. In this manner, a user may confirm the system power supply configuration corresponds to the preferred system power supply configuration.

BRIEF DESCRIPTION OF THE DRAWINGS

Aspects of the present disclosure are best understood from the following detailed description when read with the accompanying figures, in which.

DETAILED DESCRIPTION

It is to be understood that the following disclosure provides many different embodiments or examples for implementing different features of various embodiments. Specific examples of components and arrangements are described below to simplify the present disclosure. These are, of course, merely examples and are not intended to be limiting.

Figure 1:
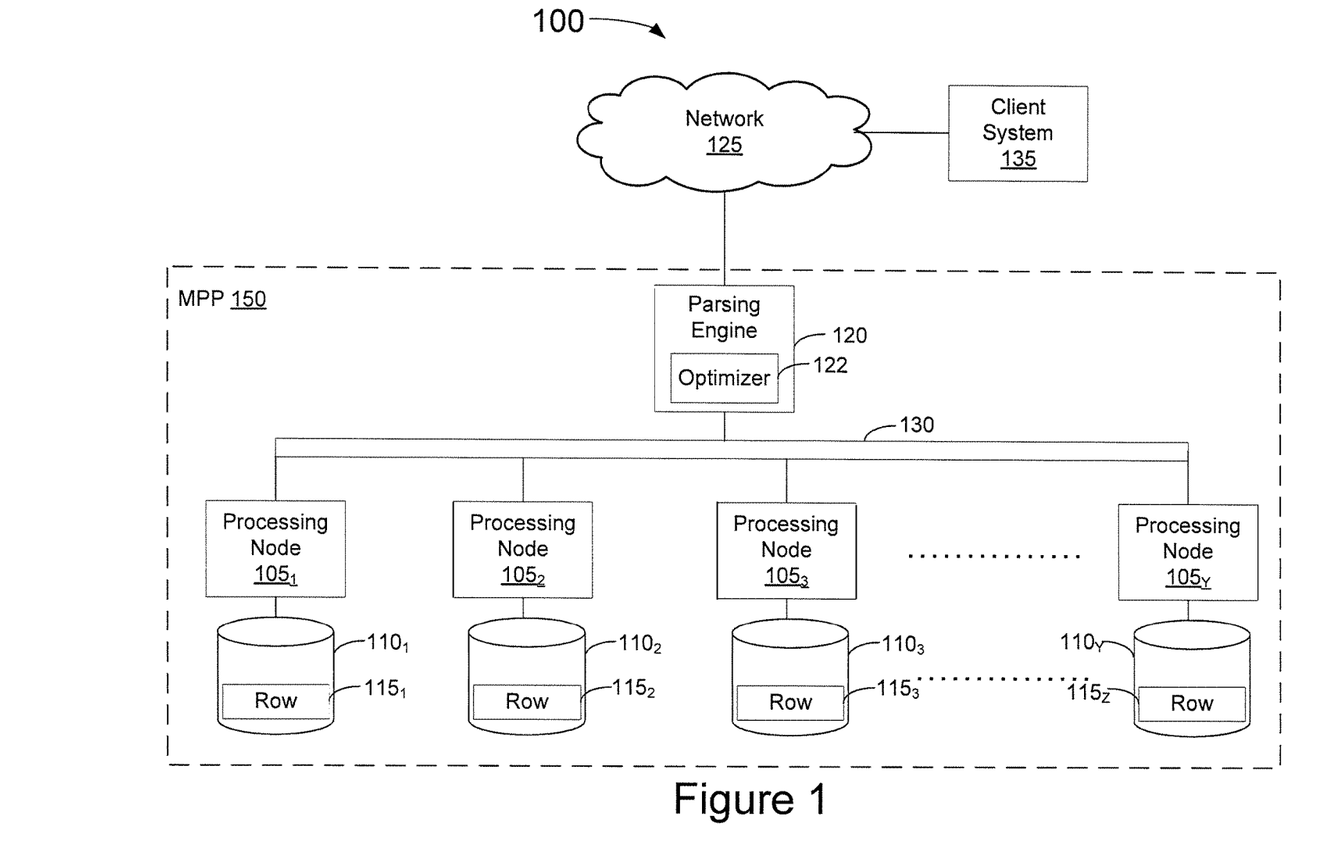
FIG. 1 depicts a diagrammatic representation of an exemplary architecture for a large database system that is suited for implementing mechanisms for providing a dynamic view and testing tool of power cabling of a multi-chassis computer system in accordance with disclosed embodiments.

FIG. 1 depicts a diagrammatic representation of an exemplary architecture for a large database system 100, such as a Teradata Active Data Warehousing System, that is suited for implementing mechanisms for providing a dynamic view and testing tool of power cabling of a multi-chassis computer system in accordance with disclosed embodiments. The database system 100 includes a relational database management system (RDBMS) built upon a massively parallel processing (MPP) system 150. Other types of database systems, such as object-relational database management systems (ORDBMS) or those built on symmetric multi-processing (SMP) platforms, are also suited for use, and the depicted and described architecture is exemplary only and is chosen to facilitate an understanding of the disclosed embodiments.

As shown, the database system 100 includes one or more processing nodes $105_{1 \ldots Y}$ that manage the storage and retrieval of data in data-storage facilities $110_{1 \ldots Y}$. Each of the processing nodes may host one or more AMPs or other processing modules. Each of the data-storage facilities $110_{1 \ldots Y}$ includes one or more disk drives or other storage medium.

The system stores data in one or more tables in the data-storage facilities $110_{1 \ldots Y}$. The rows $115_{1 \ldots Z}$ of the tables are stored across multiple data-storage facilities $110_{1 \ldots Y}$ to ensure that the system workload is distributed evenly across the processing nodes $105_{1 \ldots Y}$. A parsing engine 120 organizes the storage of data and the distribution of table rows $115_{1 \ldots Z}$ among the processing nodes $105_{1 \ldots Y}$ and accesses processing nodes $105_{1 \ldots Y}$ via an interconnect 130. The parsing engine 120 also coordinates the retrieval of data from the data-storage facilities $110_{1 \ldots Y}$ in response to queries received from a user, such as one using a client computer system 135 connected to the database system 100 through a network connection 125. The parsing engine 120, on receiving an incoming database query, applies an optimizer component 122 to the query to assess the best plan for execution of the query. Selecting the optimal query-execution plan includes, among other things, identifying which of the processing nodes $105_{1 \ldots Y}$ are involved in executing the query and which database tables are involved in the query, as well as choosing which data-manipulation techniques will serve best in satisfying the conditions of the query. Database statistics are used in making these assessments during construction of the query-execution plan. For example, database statistics may be used by the optimizer to determine data demographics, such as attribute minimum and maximum values and data ranges of the database. The database system typically receives queries in a standard format, such as the Structured Query Language (SQL) put forth by the American National Standards Institute (ANSI).

Figure 2:
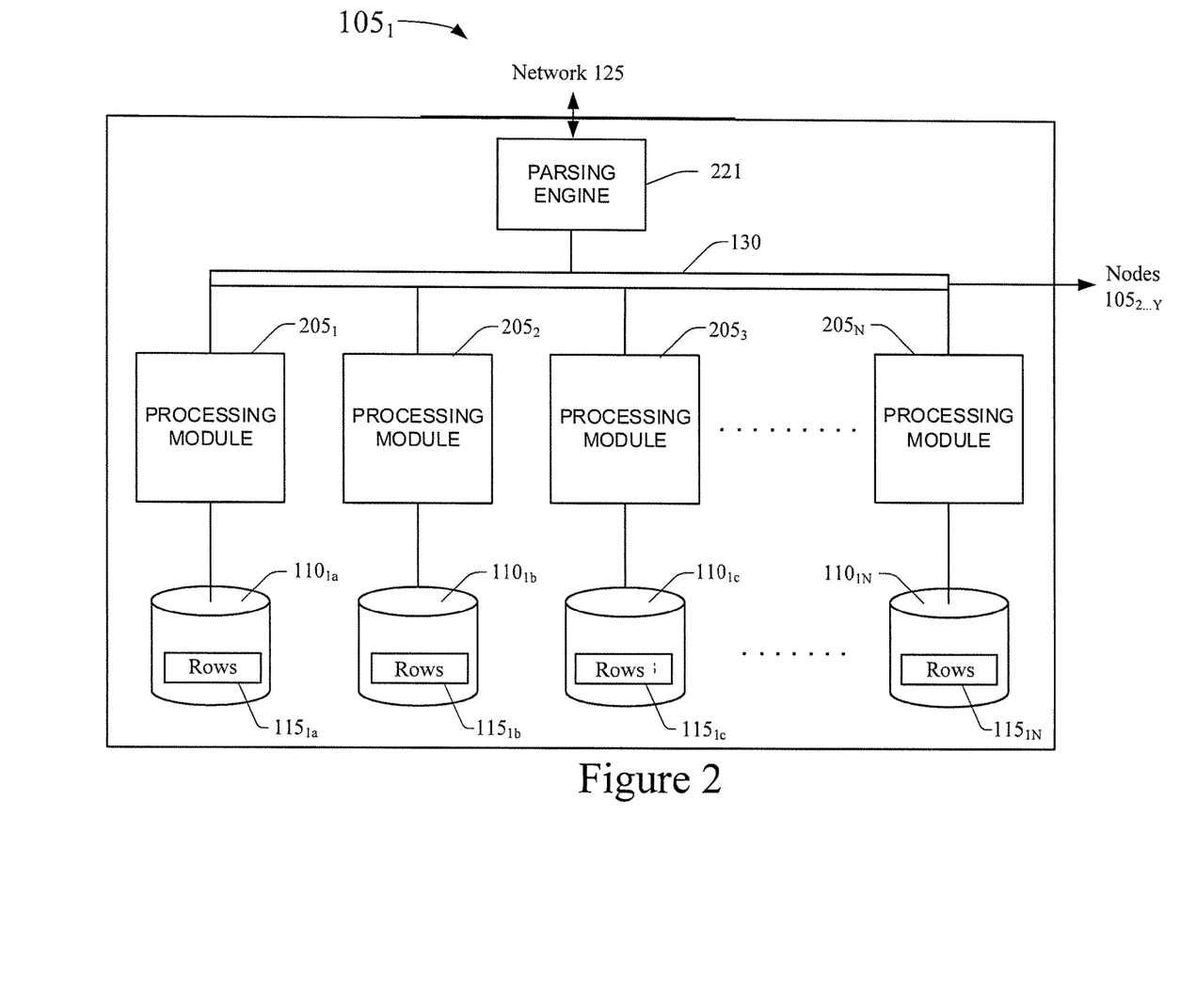
FIG. 2 depicts a diagrammatic representation of a sample architecture for one processing node of the system depicted in FIG. 1.

FIG. 2 depicts a diagrammatic representation of a sample architecture for one processing node $105_1$ of the DBS 100. The DBS node $105_1$ includes one or more processing modules $205_{1 \ldots N}$, such as one or more AMPs, connected by an interconnect 130 that manage the storage and retrieval of data in data-storage facilities $110_{1a \ldots 1N}$. Each of the processing modules $205_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors. For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $205_{1 \ldots N}$ manages a portion of a database that is stored in a corresponding one of the data-storage facilities $110_{1a \ldots 1N}$. Each of the data-storage facilities $110_{1a \ldots 1N}$ includes one or more disk drives. The DBS may include multiple nodes $105_{2 \ldots Y}$ in addition to the illustrated node $105_1$, connected by way of the interconnect 130.

A parsing engine 221 instance organizes the storage of data and the distribution of table rows $115_{1a \ldots 1N}$ among the processing modules $205_{1 \ldots N}$. The parsing engine 221 also coordinates the retrieval of data from the data-storage facilities $110_{1a \ldots 1N}$ in response to queries received from a user at a client computer system. The DBS 100 usually receives queries and commands to build tables in a standard format, such as SQL.

In one implementation, the rows $115_{1a \ldots 1N}$ are distributed across the data-storage facilities $110_{1a \ldots 1N}$ by the parsing engine 221 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to data-storage facilities $110_{1a \ldots 1N}$ and associated processing modules $205_{1 \ldots N}$ by a hash bucket map. The characteristics of the columns chosen for the primary index determine how evenly the rows are distributed.

Figure 3:
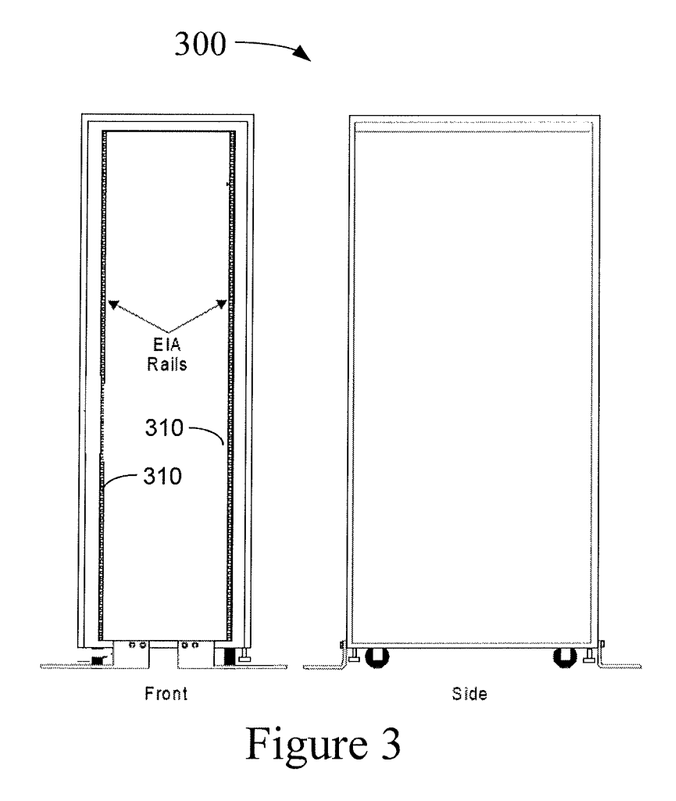
FIG. 3 is a diagrammatic representation of a front and side view of a rack based computer system chassis in which a large database system may be deployed and in which disclosed embodiments may be implemented.

FIG. 3 is a diagrammatic representation of a front and side view of a rack based computer system chassis 300 in which a large database system, such as the database system 100 depicted in FIG. 1, may be deployed and in which disclosed embodiments may be implemented.

The rack mount system chassis may include various modules designed for mounting in the chassis 300. Vertical rails 310 at the front of the rack, referred to as EIA rails, may have hole patterns that can be used to facilitate vertical measurements within the chassis for placement of modules in the chassis.

The chassis may include a power source, either an AC box or a universal power supply (UPS), and may accommodate various modules, including computing nodes, also referred to as a node chassis or system server, console components including a monitor, keyboard and mouse, console switch, a disk array subsystem chassis, modular disk chassis (or disk array) containing a plurality of disk drives, expansion modules, switching systems, and the like.

Figure 4:
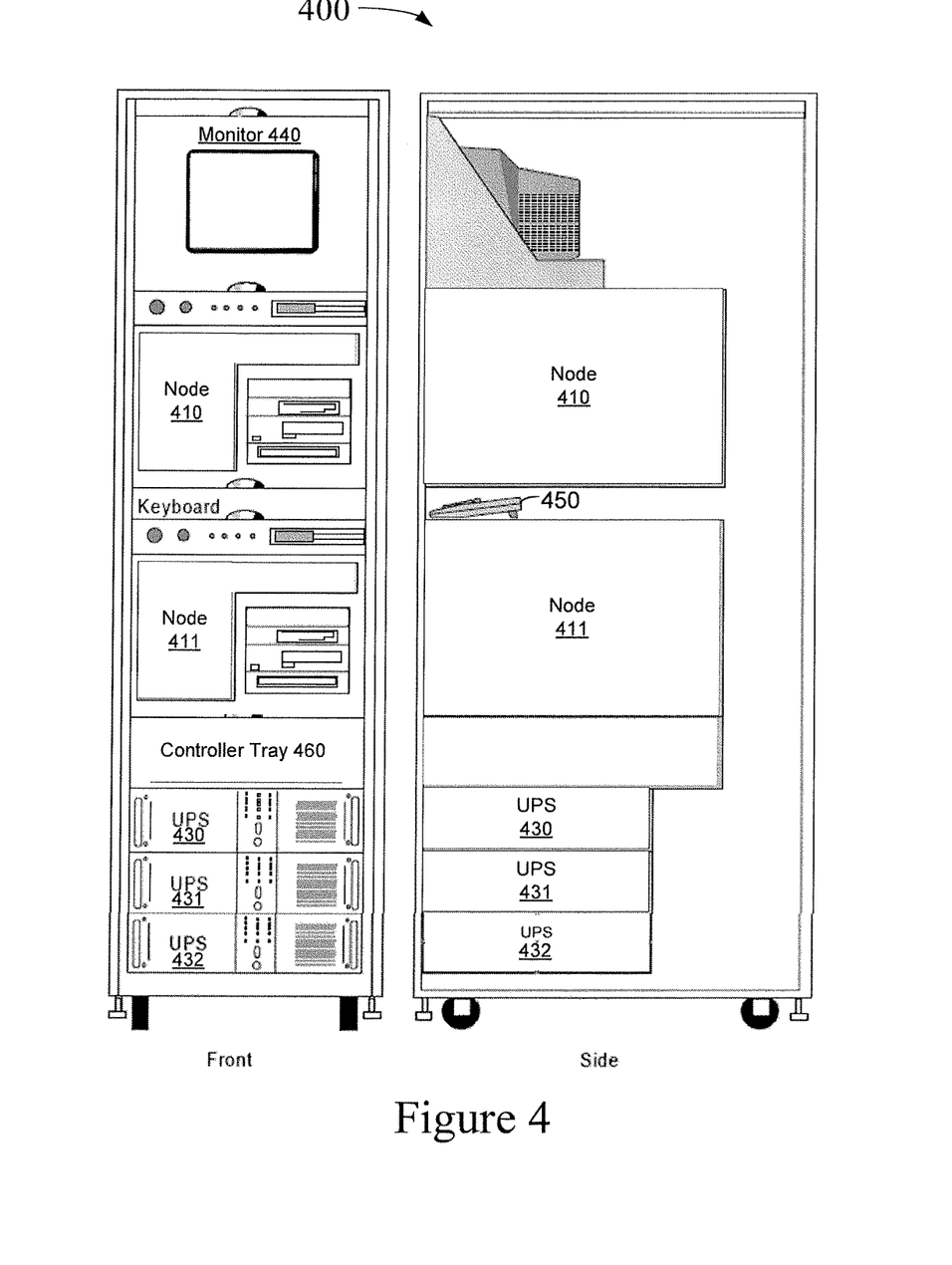
FIG. 4 is a diagrammatic representation of a front and side view of the rack based computer system chassis of FIG. 3 depicting internal components of the chassis in which disclosed embodiments may be implemented.

FIG. 4 is a diagrammatic representation 400 of a front and side view of the rack based computer system chassis 300 of FIG. 3 depicting internal components of the chassis in which disclosed embodiments may be implemented.

In the illustrative example, the system chassis 300 includes two nodes 410 and 411. Each of the nodes 410 and 411 may include various processors, disk drives, memory modules, BIOS modules, and various other components. Disk drives of a node may be arranged in one or more disk arrays each comprising a plurality of disk drives. A plurality of power supply systems, e.g., Universal Power Supplies (UPSs) 430-432, may be included in the chassis 300 that supply power to various system components. The chassis may include a monitor 440 and a keyboard 450 that allow for configuration and control of system components. Alternatively, the monitor 440 and keyboard may be communicatively interfaced with the chassis 300 to allow remote access thereto. A controller tray 460 allows for administrator access to configuration and operating system components and thus may communicatively interface with the monitor 440 and keyboard 450. The controller tray may include one or more processors, memory devices, disk drives, or other components.

Densely packed, rack-based, multi-chassis computer systems require complex power cabling. During setup and maintenance, it is often difficult for technicians to detect improper cabling. If left undetected, an improperly cabled system may appear to be functioning normally but may lead to faulty shutdown sequencing in a power failure scenario which could lead to data corruption.

In accordance with disclosed embodiments, a software-based graphical user interface (GUI) tool facilitates the detection of improper cabling. The GUI provides a display of key power components, e.g., chassis power supplies and UPS load groups of a multi-chassis computer system. The display may indicate the position, orientation and status of various components, and enable technicians to determine through point and click, or other, interaction which UPS load groups should be connected to which chassis power supply. Further, the display also allows users to turn load groups on and off to verify through status indicators the actual physical connections of the load groups and power supplies.

Figure 5:
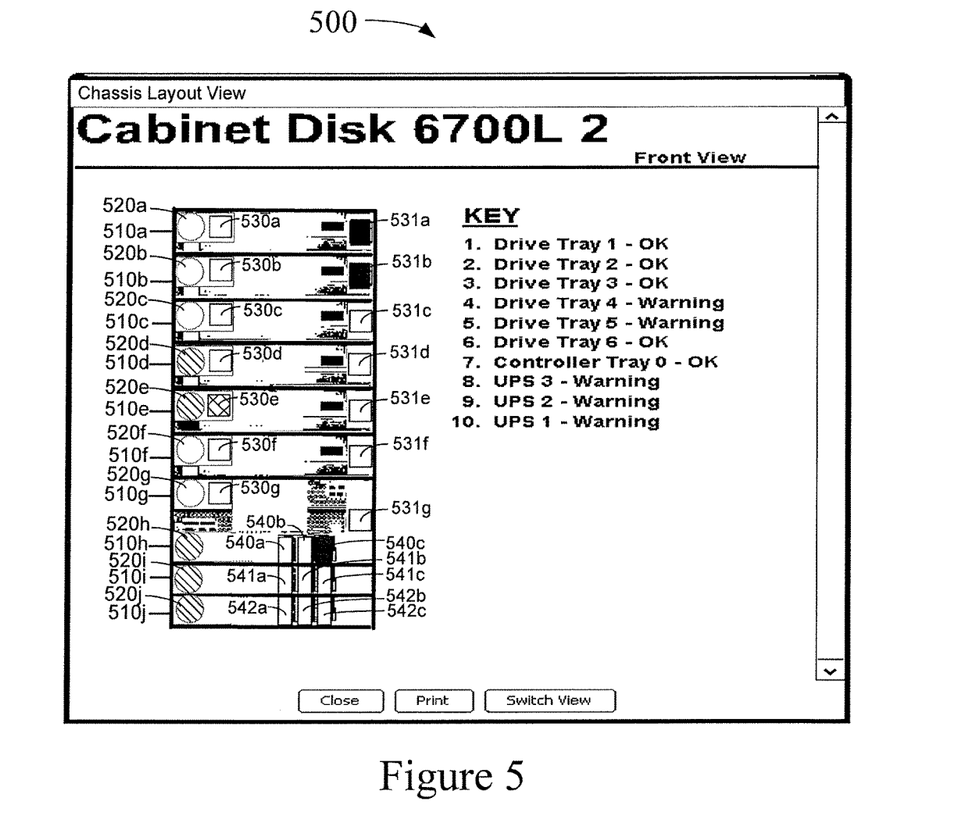
FIG. 5 is a diagrammatic representation of a system tool graphical user interface that facilitates the detection of improper cabling of a rack-based, multi-chassis computer system implemented in accordance with an embodiment.

FIG. 5 is a diagrammatic representation of a system tool GUI 500 that facilitates the detection of improper cabling of a rack-based, multi-chassis computer system implemented in accordance with an embodiment. The system tool may be implemented as computer-executable instructions tangibly embodied on a computer-readable medium executable by a processing system, such as a processing module of the controller tray 460 depicted in FIG. 4.

The GUI 500 depicts various system components and may provide indicia that provide a user with information regarding the system configuration, e.g., power cabling. In the illustrative example, the GUI 500 depicts diagrammatic representations of various drive trays 510*a*-510*f*, a controller tray 510*g*, and UPS components 510*h*-510*j*.

In the illustrative example, assume each of the drive trays 510*a*-510*f* and controller tray 510*g* are provided with two power supplies, e.g., a primary power supply and a backup power supply. Accordingly, a power supply status icon 530*a*-530*g* may be displayed respectively in association with each of the drive trays 510*a*-510*f* and the controller tray 510*g*. For example, the power supply status icon 530*a*-530*g* may provide an operational indication of a primary power supply provided to each of the drive trays 510*a*-510*f* and the controller tray 510*g*. Likewise, power supply status icons 531*a*-531*g* may provide an operational indication of a secondary, or backup, power supply for each of the drive trays 510*a*-510*f* and the controller tray 510*g*.

Each of the power supplies 510*h*-510*j* may provide power to one or more respective load groups, wherein a load group comprises one or more system components. In the illustrative example, the power supplies 510*h*-510*j* may supply power to three separate load groups. Accordingly, each GUI representation of power supplies 510*h*-510*j* may include load group icons that provide an indicia of the power supply load group interface. For example, the GUI representation of power supplies 510*h*-510*j* may include respective load groups 540*a*-540*c*, 541*a*-541*c*, and 542*a*-542*c*. In an embodiment, the load group represented by icons 540*a*-540*c*, 541*a*-541*c*, and 542*a*-542*c* may be user selectable, and the GUI may provide a display indication of the components currently configured for power supply in the selected load group. For example, in the depicted representation, a user has selected a third load group 540*c* of power supply 510*h* (as indicated by the solid load group 540*c* icon). In response to selection of the third load group 540*c*, the GUI 500 provides an indication of the system trays or components currently configured for power supply in the selected load group. In the present example, an indication that the secondary power supplies of drive trays 510*a*-510*b* are provided by the third load group of power supply 510*h* (illustratively designated by solid power supply status icons 531*a*-531*b*).

In another embodiment, each of the various drive trays 510*a*-510*f*, the controller tray 510*g*, and UPS components 510*h*-510*j* may include a respective general status icon 520*a*-520*j*. The general status icons 520*a*-520*j* may provide an indication to an operator of a general operational status of the corresponding component. For example, in the present example, each of the drive trays 510*a*-510*c* and 510*f*, and the controller tray 510*g* are identified as comprising a general suitable operational configuration by the status icons 520*a*-520*c*, 520*f* and 520*g* (as illustrated by the non-hatched icon indicia). A status warning may be provided by the general status icons, such as icons 520*d*-520*e* and 520*h*-520*j*, that indicate an operational warning corresponding to drive trays 510*d*-510*e* and power supplies 510*h*-510*j*. In a similar manner, the power supply status icons may provide an operational status of a corresponding component. For example, in the illustrative example, the power supply status icon 530*e* indicates (as designated by cross-hatches) that the corresponding drive tray 510*e* is not receiving power from the primary power supply associated with the status icon 530*e*.

In accordance with another embodiment, the controller tray 510*g* may be configured with a desired system power supply system configuration. For example, a preferred power supply configuration may be defined in software of the controller tray that specifies a preferred load group that is desired to be connected to a particular power supply. To this end, a user may supply an input, e.g., by positioning a cursor or other input over a particular load group icon. In such a situation, the GUI 500 may provide a visual indicia of the drive trays or other system components that are preferred to be powered by the selected load group. In this manner, the user may evaluate the system configuration by selecting a particular load group represented by an icon 540*a*-542*c* to evaluate whether the system preferred configuration matches the currently configured configuration.

Figure 6:
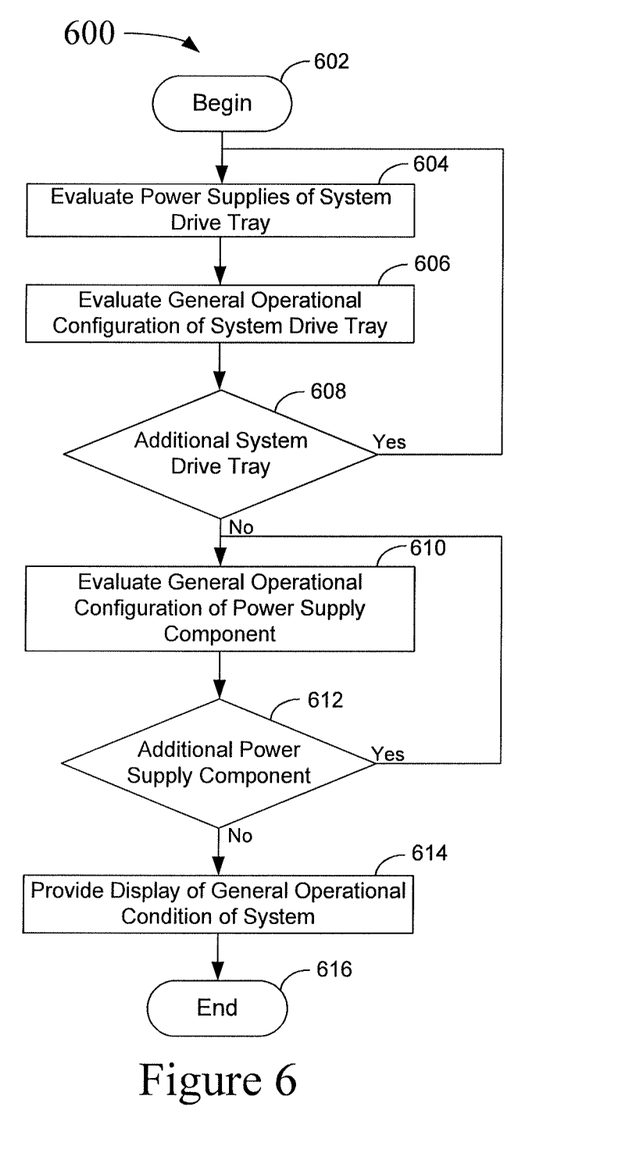
FIG. 6 is a flowchart that depicts processing of a general operational system status display configuration implemented in accordance with an embodiment.

FIG. 6 is a flowchart 600 that depicts processing of a general operational system status display configuration procedure implemented in accordance with an embodiment. The processing steps of FIG. 6 may be implemented as computer-executable instructions tangibly embodied on a computer-readable medium executable by a processing system, such as one or more of the processing nodes $105_1$-$105_Y$ depicted in FIG. 1.

The system procedure is invoked (step 602), and an evaluation of the power supplies of a system drive tray may be evaluated for the operational status thereof (step 604). The general operational configuration of a drive tray may then be evaluated (step 606). An evaluation may then be made to determine if another drive tray remains for evaluation (step 608). If so, the routine may then return to evaluate the power supplies of the currently evaluated drive tray according to step 604.

When no additional drive tray remains for evaluation, the general operational configuration of a power supply component may then be evaluated (step 610). An evaluation may then be made to determine if an additional power supply component remains for evaluation (step 612). If so, the system may return to evaluate the general operational configuration of the power supply according to step 610. When no additional power supply component remains for evaluation, a general operational condition of the system may be provided (step 614), and the general operational system status display configuration cycle may then end (step 616). In this manner, the general operational status of system components may be displayed to a system user.

In an embodiment, the controller, e.g., controller tray 510*g*, may include, or otherwise access, preferred system configuration data. For example, preferred power cabling for each load group may be accessed by the controller, where each load group comprises one or more system trays or components. In an embodiment, a user may select a particular load group, and the controller may then provide a display of the preferred power supply cabling for the selected load group as described more fully hereinbelow.

Figure 7:
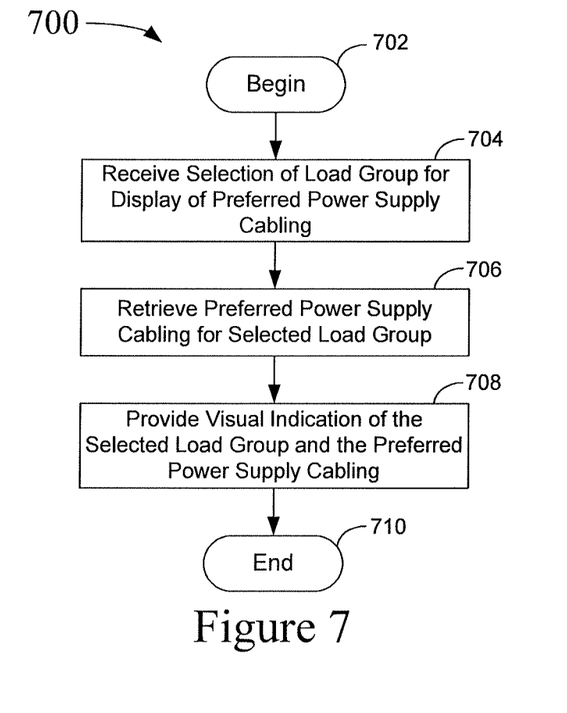
FIG. 7 is a flowchart that depicts processing of display of a preferred load group power cabling routine implemented in accordance with an embodiment.

FIG. 7 is a flowchart 700 that depicts processing of a preferred load group power cabling routine implemented in accordance with an embodiment. The processing steps of FIG. 7 may be implemented as computer-executable instructions tangibly embodied on a computer-readable medium executable by a processing system, such as one or more of the processing nodes $105_1$-$105_Y$ depicted in FIG. 1.

The preferred load group power cabling routine is invoked (step 702), and the controller may receive a user selection of a load group for which the preferred power supply cabling is desired to be displayed (step 704). For example, in one embodiment, the user may position a mouse pointer over one of the load group icons 540a-542c associated with a particular load group, although other suitable selection mechanisms may be substituted therefor. The preferred load group power cabling routine may then retrieve the preferred power supply cabling of the selected load group that indicates the preferred system components to be interfaced with the power supply for the selected load group (step 706). The preferred load group power cabling routine may then provide a visual display of the selected load group and power supply indicia for the components of the load group (step 708). For example, components of the selected load group and the corresponding power supply may be displayed with indicia, e.g., in a particular color, to provide a graphical view of the preferred components to be power supplied in the corresponding load group. The preferred load group power cabling routine cycle may then end (step 710).

Figure 8:
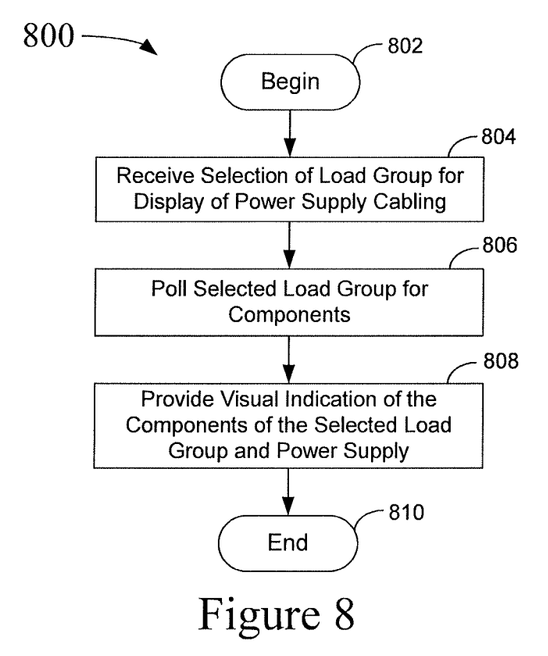
FIG. 8 is a flowchart that depicts processing of display of a load group power cabling routine implemented in accordance with an embodiment.

FIG. 8 is a flowchart 800 that depicts processing of a load group power cabling routine implemented in accordance with an embodiment. The processing steps of FIG. 8 may be implemented as computer-executable instructions tangibly embodied on a computer-readable medium executable by a processing system, such as one or more of the processing nodes $105_1$-$105_Y$ depicted in FIG. 1.

The load group power cabling routine is invoked (step 802), and the controller may receive a user selection of a load group for which the power supply cabling may be displayed (step 804). For example, in one embodiment, the user may select one of a load group icon 540a-542c corresponding to a load group, e.g., via a mouse click of the icon corresponding to a particular load group. The load group power cabling routine may then poll the components of the load group currently powered by the power supply (step 806). The load group power cabling routine may then provide a visual display of the components of the selected load group and the power supply (step 808). For example, the power supply status icons of the components of the selected load group and load group icons may be displayed in a particular color to provide a graphical view of the components powered in the corresponding load group. The load group power cabling routine cycle may then end (step 810).

As described, a method, computer-readable medium, and system that facilitate display of a multi-chassis computer system configuration is provided. A GUI may provide a display that indicates the position and status of system components and enables a user a convenient mechanism to determine via load group selection which UPS load groups are preferred to be connected to which chassis power supply, and further provides a mechanism to determine via load group selection which UPS load groups are connected to which chassis power supply. In this manner, a user may confirm the system power supply configuration corresponds to the desired system power supply configuration.

The flowcharts of FIGS. 6-8 depict process serialization to facilitate an understanding of disclosed embodiments and are not necessarily indicative of the serialization of the operations being performed. In various embodiments, the processing steps described in FIGS. 6-8 may be performed in varying order, and one or more depicted steps may be performed in parallel with other steps. Additionally, execution of some processing steps of FIGS. 6-8 may be excluded without departing from embodiments disclosed herein.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the disclosed embodiments may be implemented in software, hardware, firmware, or a combination thereof. The various elements of the system, either individually or in combination, may be implemented as a computer program product tangibly embodied in a machine-readable storage device for execution by a processing unit. Various steps of embodiments may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying aspects of the disclosed embodiments can be loaded onto a computer. The computer program is not limited to any particular embodiment, and may, for example, be implemented in an operating system, application program, foreground or background process, or any combination thereof, executing on a single processor or multiple processors. Additionally, various steps of embodiments may provide one or more data structures generated, produced, received, or otherwise implemented on a computer-readable medium, such as a memory.

Although disclosed embodiments have been illustrated in the accompanying drawings and described in the foregoing description, it will be understood that embodiments are not limited to the disclosed examples, but are capable of numerous rearrangements, modifications, and substitutions without departing from the disclosed embodiments as set forth and defined by the following claims. For example, the capabilities of the disclosed embodiments can be performed fully and/or partially by one or more of the blocks, modules, processors or memories. Also, these capabilities may be performed in the current manner or in a distributed manner and on, or via, any device able to provide and/or receive information. Still further, although depicted in a particular manner, a greater or lesser number of modules and connections can be utilized with the present disclosure in order to accomplish embodiments, to provide additional known features to present embodiments, and/or to make disclosed embodiments more efficient. Also, the information sent between various modules can be sent between the modules via at least one of a data network, an Internet Protocol network, a wireless source, and a wired source and via a plurality of protocols.

What is claimed is:

1. A method of providing a dynamic view and testing of power cabling in a multi-chassis computer system, comprising:

providing, by a processing module, a graphical user interface that depicts system components of the multi-chassis computer system;

providing, by the processing module through the graphical user interface, a plurality of display icons each in association with one of the system components that indicate a power supply status of a corresponding system component, wherein the plurality of display icons comprises a plurality of multi-state display icons;

providing, by the processing module through the graphical user interface, a display of preferred power supply cabling of one or more system components included in a load group, wherein the preferred power supply cabling is visually indicated using a first state of associated multi-state display icons of the one or more system components, and wherein the preferred power supply cabling is indicative of cabling from a preferred power supply of a plurality of power supplies to the load group; and providing, by the processing module through the graphical user interface, a display of power supply cabling of the one or more system components included in the load group, wherein the power supply cabling is visually indicated using a second state of the associated multi-state display icons of the one or more system components, and wherein the power supply cabling is indicative of actual power supply cabling from at least one of the plurality of power supplies to the load group, wherein the processing module, through the graphical user interface, is configured to selectively switch between the first state of the associated multi-state display icons and the second state of the associated multi-state display icons.

2. The method of claim 1, wherein the system components include a plurality of drive trays that each host a respective plurality of disk drives.

3. The method of claim 1, further comprising providing, by the processing module through the graphical user interface, a display of a plurality of load group icons each associated with a respective load group, wherein each load group comprises one or more system components.

4. The method of claim 1, wherein providing, by the processing module through the graphical user interface, a display of a preferred power supply cabling of one or more system components included in a load group further comprises providing, by the processing module through the graphical user interface, the display of the preferred power supply cabling of the one or more system components responsive to selection, by a user, of a display icon associated with the load group.

5. The method of claim 1, wherein providing, by the processing module through the graphical user interface, a display of power supply cabling of one or more system components included in a load group further comprises providing, by the processing module through the graphical user interface, the display of the power supply cabling of the one or more system components responsive to selection, by a user, of a display icon associated with the load group.

6. The method of claim 1, further comprising providing, by the processing module through the graphical user interface, display of the plurality of power supplies wherein the plurality of power supplies is visually indicated using associated display icons of the one or more system components, and wherein each power supply is configured to provide selective cabling to one or more of the system components.

7. The method of claim 6, further comprising displaying, by the processing module through the graphical user interface, in association with each of the plurality of power supplies, one or more selectable display icons associated with load groups.

8. A non-transitory computer-readable medium having computer-executable instructions for execution by a processing system, the computer-executable instructions for providing a dynamic view and testing of power cabling in a multi-chassis computer system, the computer-executable instructions, when executed, cause the processing system to:

provide, by a processing module, a graphical user interface that depicts system components of the multi-chassis computer system;

provide, by the processing module through the graphical user interface, a plurality of display icons each in association with one of the system components that indicate a power supply status of a corresponding system component, wherein the plurality of display icons comprises a plurality of multi-state display icons;

provide, by the processing module through the graphical user interface, a display of a preferred power supply cabling of one or more system components included in a load group, wherein the preferred power supply cabling is visually indicated using a first state of associated multi-state display icons of the one or more system components, and wherein the preferred power supply cabling is indicative of cabling from a preferred power supply of a plurality of power supplies to the load group; and provide, by the processing module through the graphical user interface, a display of power supply cabling of the one or more system components included in the load group, wherein the power supply cabling is visually indicated using a second state of the associated multi-state display icons of the one or more system components, and wherein power supply cabling is indicative of actual power supply cabling from at least one of the plurality of power supplies to the load group, wherein the processing module, through the graphical user interface, is configured to selectively switch between the first state of the associated multi-state display icons and the second state of the associated multi-state display icons.

9. The non-transitory computer-readable medium of claim 8, wherein the system components include a plurality of drive trays that each host a respective plurality of disk drives.

10. The non-transitory computer-readable medium of claim 8, further comprising instructions that, when executed, cause the processing system to provide, by the processing module through the graphical user interface, a display of a plurality of load group icons each associated with a respective load group, wherein each load group comprises one or more system components.

11. The non-transitory computer-readable medium of claim 8, wherein the instructions that cause the processing system to provide, by the processing module through the graphical user interface, a display of a preferred power supply cabling of one or more system components included in a load group further comprise instructions that, when executed, cause the processing system to provide, by the processing module through the graphical user interface, the display of the preferred power supply cabling of the one or more system components responsive to selection, by a user, of display icon associated with the load group.

12. The non-transitory computer-readable medium of claim 8, wherein the instructions that cause the processing system to provide, by the processing module through the graphical user interface, a display of power supply cabling of one or more system components included in a load group further comprise instructions that, when executed, cause the processing system to provide, by the processing module through the graphical user interface, the display of the power supply cabling of the one or more system components responsive to selection, by a user, of display icon associated with the load group.

13. The non-transitory computer-readable medium of claim 8, further comprising instructions that, when executed, cause the processing system to provide, by the processing module through the graphical user interface, a display of the plurality of power supplies, wherein each power supply is configured to be provide selective cabling to one or more of the system components.

14. The non-transitory computer-readable medium of claim 13, further comprising instructions that, when executed, cause the processing system to display, by the processing module through the graphical user interface, in association with each of the plurality of power supplies, one or more selectable display icons associated with load groups.

15. A multi-chassis computer system, comprising:
a plurality of system trays;
a plurality of power supply components; and
a controller tray that includes a processing module configured to:
provide a graphical user interface that depicts system components of the multi-chassis computer system;
provide, through the graphical user interface, a plurality of display icons each in association with one of the system components that respectively indicate a power supply status of a corresponding system component, wherein the plurality of display icons comprises a plurality of multi-state display icons;
provide, through the graphical user interface, a display of preferred power supply cabling of one or more system components included in a load group, wherein the preferred power supply cabling is visually indicated using a first state of associated multi-state display icons of the one or more system components, and wherein the preferred power supply cabling is indicative of cabling from a preferred power supply of a plurality of power supplies to the load group; and
provide, through the graphical user interface, a display of power supply cabling of the one or more system components included in the load group, wherein the power supply cabling is visually indicated using a second state of the associated multi-state display icons of the one or more system components, and wherein the power supply cabling is indicative of actual power supply cabling from at least one of the plurality of power supplies to the load group, wherein the processing module, through the graphical user interface, is further configured to selectively switch between the first state of the associated multi-state display icons and the second state of the associated multi-state display icons.

16. The system of claim 15, wherein the system components include a plurality of drive trays that each host a respective plurality of disk drives.

17. The system of claim 15, wherein the processing module is further configured to provide, through the graphical user interface, a display of a plurality of load group icons each associated with a respective load group, wherein each load group comprises one or more system components.

18. The system of claim 15, wherein the processing module is further configured to provide, through the graphical user interface, the display of the preferred power supply cabling of the one or more system components in response to selection, by a user, of a display icon associated with the load group.

19. The system of claim 15, wherein the processing module is further configured to provide, through the graphical user interface, the display of the power supply cabling of the one or more system components in response to selection, by a user, of a display icon associated with the load group.

20. The system of claim 15, wherein the processing module is further configured to provide, through the graphical user interface, a display of the plurality of power supplies, wherein the plurality of power supplies is visually indicated using associated display icons of the one or more system components, and wherein each power supply is configured to provide selective cabling to one or more of the system components.

* * * * *